M. SCHWALBACH, 3 Sheets—Sheet 1.
Assignor to T. A. MACAULAY.
SEWING MACHINE.
No. 9,933. Reissued Nov. 15, 1881.
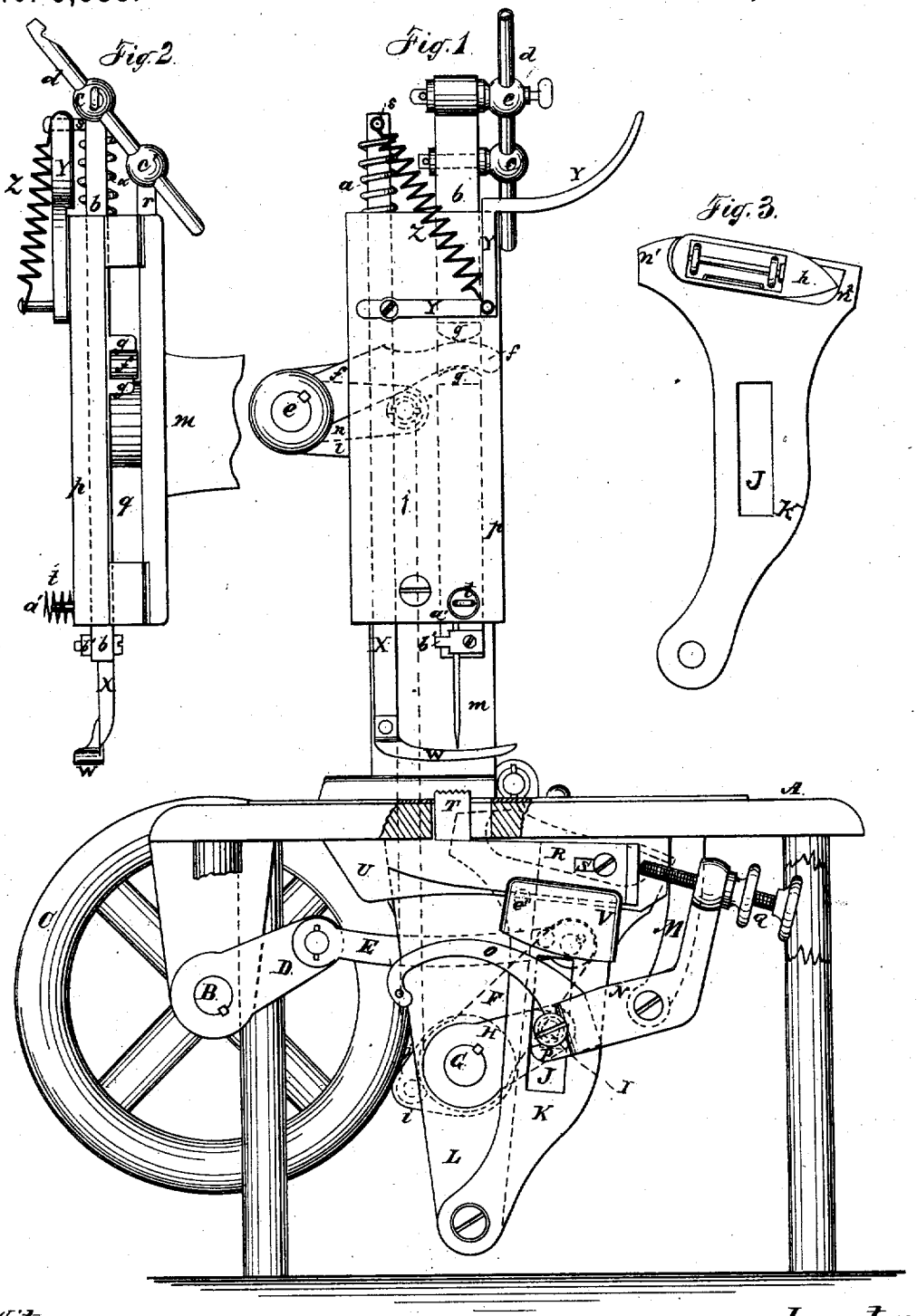
Witnesses:
Wm F Ferguson
J. H. Seven
Inventor
M. Schwalbach
By Thos. A. Macaulay
his attorney
N. PETERS, Photo-Lithographer, Washington, D. C.

3 Sheets—Sheet 2.
M. SCHWALBACH,
Assignor to T. A. MACAULAY.
SEWING MACHINE.
No. 9,933. Reissued Nov. 15, 1881.
Fig. 4.
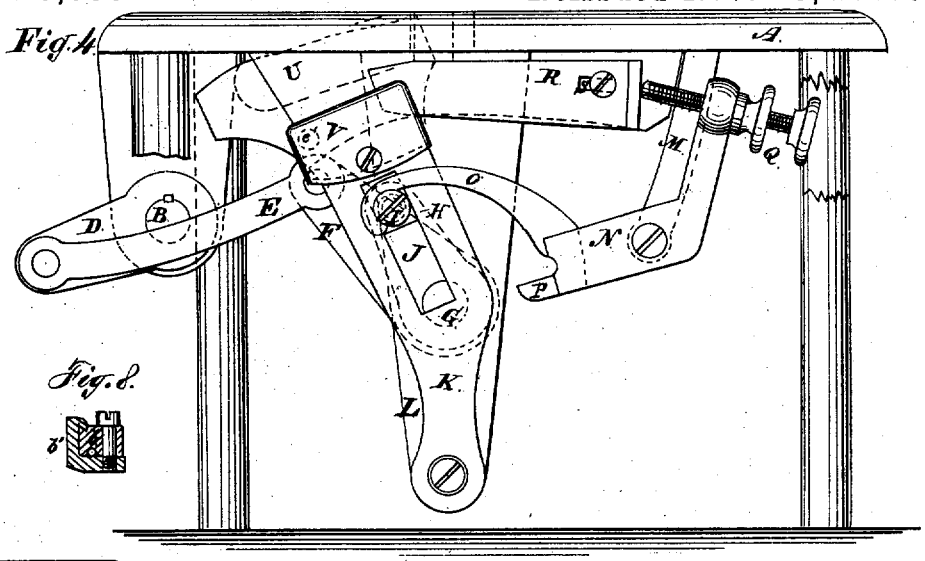
Fig. 8.
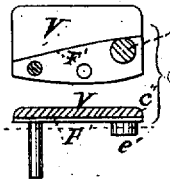
Fig. 9.
Fig. 5.
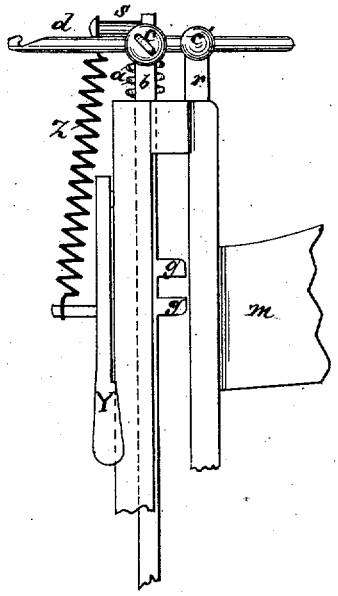
Fig. 6.
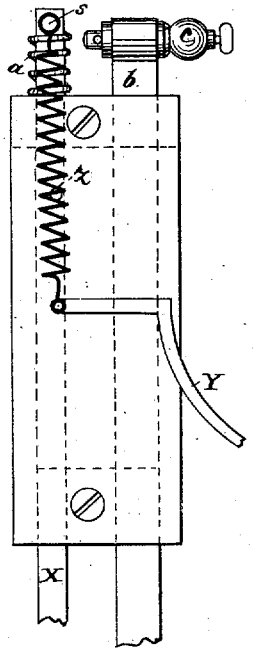
Witnesses:
Wm F. Ferguson.
J. H. Lover
Inventor
M. Schwalbach
By Thos. A. Macaulay
his attorney
N. PETERS, Photo-Lithographer, Washington, D. C.

M. SCHWALBACH,
Assignor to T. A. MACAULAY.
SEWING MACHINE.
3 Sheets—Sheet 3.
No. 9,933. Reissued Nov. 15, 1881.
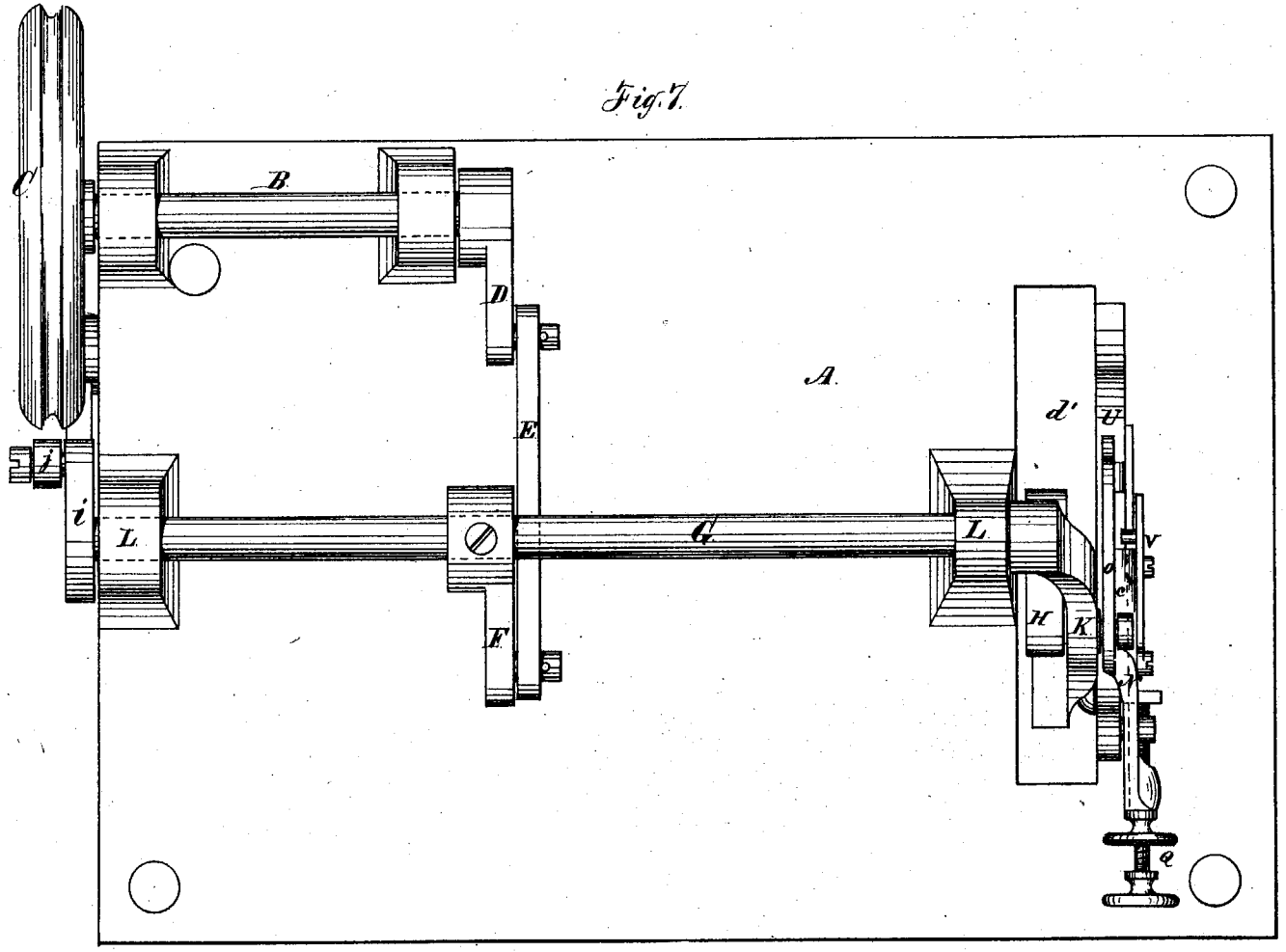
Witnesses:
Wm F. Ferguson
J. H. Levey
Inventor:
M. Schwalbach
By Thos A. Macaulay
his Attorney
N. PETERS, Photo-Lithographer, Washington, D. C.

UNITED STATES PATENT OFFICE.

MATHIAS SCHWALBACH, OF MILWAUKEE, WISCONSIN, ASSIGNOR TO THOMAS A. MACAULAY, OF NEW YORK, N. Y.

SEWING-MACHINE.

SPECIFICATION forming part of Reissued Letters Patent No. 9,933, dated November 15, 1881.

Original No. 56,805, dated July 31, 1866. Application for reissue filed June 29, 1881.

*To all whom it may concern:*

Be it known that I, MATHIAS SCHWALBACH, of Milwaukee, Milwaukee county, State of Wisconsin, have invented a new and useful Improvement in Sewing-Machines; and I do hereby declare that the following is a full, clear, and exact description thereof, which will enable others skilled in the art to make and use the same, reference being had to the accompanying drawings, forming part of this specification, in which—

Figure 1, Sheet 1, is a front elevation of a sewing-machine made according to my invention. Fig. 2 is a detailed side view of the needle-bar and other parts adjacent to it. Fig. 3 is a detailed view of the shuttle-carrier. Fig. 4, Sheet 2, is a detailed front view of the feeding devices and shuttle-carrier. Figs. 5 and 6 are additional views, showing different positions of the needle-bar and parts adjacent to it. Fig. 7, Sheet 3, is an under-side view of the machine. Fig. 8 shows the clamp which holds the needle to its bar. Fig. 9 is a detailed view of the inside of plate V.

Similar letters of reference indicate like parts.

One feature of my invention is that the connections of the shuttle and needle-shafts with the driving-shaft are so made and arranged that the pulley may be turned in either direction without stopping the operation of the needle or breaking the thread. The needle-bar is operated in an upright slide by a lever attached to the needle-shaft, and carries a tension-rod that regulates the supply and tension of the thread. The shuttle is carried in a socket formed in the upper end of a vibrating lever, hereinafter more particularly described. The feeding devices are made and operated in a novel way, and the needle is secured to the needle-bar by a block which is held to the bar by a set-screw.

The letter A designates the cloth-bed of a sewing-machine supported on legs of a proper height.

B is the driving-shaft, carrying a driving-pulley, C, at its rear end, and at its front end having a crank, D, which is connected by a rod or link, E, with a crank, F, or rocking arm keyed to the lower or shuttle shaft, G. This shaft G has bearings in pieces L, which hang down from the table A at or near the ends of the machine.

The letter *e* designates the upper or needle shaft, which is journaled in brackets *l*, (one of which is seen in Fig. 1,) that project from the usual right-angled arm or standard, *m*. Motion is communicated to shaft *e* from shaft G by a crank, *i*, on the back end of the latter shaft, which crank is connected by the rod *j* with a crank, *n*, fixed on the shaft. These parts are seen partly in dotted outline in Fig. 1.

*b* is a vertical needle-bar, which slides in a groove made for it in the guide-plate *p*, fixed in the forward end of the standard *m*.

Between the plates and the end of the arm is an opening, *q*, to receive a vibrating arm, *f*, extending from the needle-shaft. The end of said arm passes between lugs *g g*, which project into the opening *q* from the needle-bar. The rocking of the shaft *e* causes its arm *f* to vibrate in the opening *q*, and to carry the needle-bar up and down the proper distance. The top of the needle-bar carries a pin, *c*, which is free to rotate in its bearing. The head of the pin is perforated to receive a take-up rod, *d*, which is fastened to the pin by a set-screw. That end of the rod which extends toward the front has a hole through which the thread goes on its way to the needle. The other end of the rod goes through the head of a like pin, *c'*, which is supported by a standard, *v*, and is also free to turn in its bearings. When the needle-bar is carried upward the forward end of the tension-rod is carried up with it, and its rear end is depressed, being held in the head of the hinder pin, *c'*, which, as well as the pin in the needle-bar, is free to turn to permit this change of position of the rod and needle-bar. When the needle-bar is brought down the tension-bar is brought substantially to the position seen in Fig. 5. Thus it is seen that the tension-rod is made to vibrate on the hinder pin, *c'*, as upon a pivot, and is also free to slide to and fro in it as the needle-bar makes its reciprocations.

The needle is held against the front of the needle-bar in a shallow groove by means of a clamp, *b'*, of peculiar construction. (Shown in detailed view in Fig. 8.) The clamp is three-sided, its adjacent sides being at right angles with each other, and the shortest of the three having a tongue which fits in a shallow groove in the back of the bar. The clamp is held from moving vertically by being let into a mortise on the edge of the bar, and by a set-screw, which also screws the front of the clamp up against the needle-bar. By means of this construction the needle can be removed and replaced with ease by loosening the screw which holds the clamp without removing the clamp itself. The adjustment is therefore easily accomplished.

The presser-foot W extends from the end of the bar X, which is raised by a spiral spring, *a*, which rests on the plate *p* and presses upward against a pin, *s*, that is fixed in the top of said bar X. The presser-foot and its bar are brought down by means of a right-angled lever, Y, pivoted to the face of plate *p*, and connected to the presser-bar X by a spiral spring, Z, one end of which is fastened to the pin *s* and the other end to the lever, at the angle which is nearest to the fulcrum of said lever. The handle of the lever extends from it at a right angle, and is curved outward near its end, and is made of sufficient length to allow it, when brought down to its lowest position, to rest against a stop, *t*, that projects from the face of plate *p*. When it is desired to bring the presser-foot down against the feeding-dog the lever Y is pushed downward until its handle rests against the stop *t*, at which time the lower end of that part of the lever which is pivoted to the plate *p* is to the left of a vertical line that intersects the pin *s*, so that the lever will remain stationary, its spring Z meanwhile holding the presser-bar down with an elastic force.

The stop *t* is in the same plane as the needle, or near thereto, and has a vertical hole through it to serve as a thread-guide. A light spiral spring, *a'*, is placed around it, which is allowed to bear against the thread and push it outward. When a pull is made on the thread on the descent of the needle the spring is forced backward toward the plate *p* by the tension made on the thread, and when the needle rises the spring *a'* serves to take up some of the slack thread which is then found above the needle. The crank D makes a complete revolution around its shaft, but the cranks F *i* of shaft G and crank *n* of shaft *e* are only partially rotated, so as to make their shafts rock far enough to produce the requisite reciprocations of the needle and shuttle-carrier, which is constructed with the driving-horns *n'* and $n^2$, as shown in Fig. 3. The shuttle is carried in a socket made in the top or end of a vibrating lever or shuttle-carrier, K, which is pivoted to the lower end of the forward hanging piece, L, and is oscillated by the oscillating movement of the shuttle-shaft G, imparted from the main shaft through the link E, crank D, and arm P. The particular instrumentality for connecting the vibrating shuttle-lever with the shuttle-shaft is the crank H, which, by its pin I, works in a straight slot, J, of the shuttle-carrier K.

The feeding-dog T works up through a slot in the table, being formed on the upper side of a sliding feed-plate, R, which rests and slides in a horizontal position over a shelf, *c''*, Figs. 7 and 9, attached to the shuttle-carrier. The feed-plate R is supported in position by the aid of a plate, V, which is screwed to the forward edge of the shelf *c''*, so as to inclose the feed-plate R between the plate V and the side of a curtain, U, which hangs down from the under side of the table A, along the front edge of the transverse slot in which the shuttle makes its reciprocations. The back or inner side of the curtain coincides with the front edge of said slot, and is the surface along and against which the shuttle-carrier and shuttle move. The plate V also serves to keep the shuttle-carrier and shuttle close up against the inner side of the curtain when the screw or screws which attach it to the carrier are tightened so as to bring the plate R close up to the outer side of the curtain U. The plate V is also connected to the carrier by a pin. (Shown in dotted outline in Fig. 1.) The upper left-hand corner of the plate V has a cam-pin, *e'*, projecting a little way from its inner side, for the purpose of lifting and holding up the feed bar or plate R when the carrier has been moved toward the base of the feed-plate, and the feed-plate continues to be held up by the cam-pin *e'* during its forward-feeding motion and until such pin moves from under the stitch-plate to the left. By this means the lifting and supporting of the feed-plate during its forward movement is effected by the pin *e'*, which depends for its movement on the shuttle-carrying mechanism.

The feed-plate R has a slot, S, at its right-hand end, which receives a pin or screw that is fixed in the curtain U. This pin or screw sustains that end of plate R, and the slot allows the plate to move to and fro. The movement of the feed-plate toward the right is controlled by an adjusting-screw, Q, that passes through the top of a lever, N, which is pivoted at its fulcrum to a bracket, M.

The means for imparting movement to the lever N are as follows: The lower end of said lever is divided into two curved branches, the lower one of which, P, is short, and the upper one, O, is long. The curve of the latter is concentric with the arc described by the pin I of crank H, which moves the shuttle-carrier. The pin I projects through the slot of the carrier and beyond the plane of the branches, being below the upper one thereof. When the pin I is moved toward the right it strikes the inside of the lower branch, P, and, bearing it downward, causes the lever N to vibrate on its fulcrum and bring the end of screw Q against the end of the feed-plate, and thus the feeding-dog T is moved forward to feed the material that is being sewed. The return movement of pin I relieves the branch P, when the lever N begins to fall down toward the position given it in Fig. 4. The pin I, on completing its movement toward the left, allows the lever N to drop to its lowest position, away from the feed-plate. At that time, also, the feed-plate is allowed to fall down to its lowest position, so as to bring the feeding-dog T below the level of the cloth-table, the left-hand end of the feed-plate R being beveled or inclined to allow it to fall rapidly when the carrier, with plate V, is moved off to the left. The inner face of the plate V has a ledge, F′, (see Fig. 9,) on which the edge of the feed-plate R slides, and in which, in connection with pin *e′*, it is supported during the vibrations of the carrier and plate V. The feed-plate is carried toward the right, to be in readiness for a new feed-movement, by means of frictional contact with the plate V. When the shuttle-carrier is completing its movement toward the right the feed-plate is also raised, so as to bring its dog T above the cloth-bed, and when the crank-pin I strikes the smaller branch, P, of the feed-lever N the feed takes place.

It will be observed that the direction of the feed is not changed by a change in the direction of rotation of the driving-pulley.

The connection of the upper and lower shafts with each other, and the connection of the driving-shaft with the lower shaft, are such as that the two first-named shafts are rocked as far when the driving-pulley is revolved toward the left as when it is revolved toward the right, and consequently the needle and shuttle are moved in both cases the same distances in the same periods of time. The feed being effected through the crank-pin I and the shuttle-carrier, the order of the movements of the feeding devices is always the same, so that it is immaterial, in starting the machine, whether the motion of the driving-pulley is toward the right or left.

The supply of thread for the needle is effected through the take-up and tension-rod *d*, which, being fast at the top of the needle-bar, is made to rise and fall with it, so far as the front part of the rod is concerned, while its rear portion vibrates about the top of the standard *r*. The rod consequently is made to incline first forward and then backward, its forward inclination taking place when the needle is descending, so as to give at that time a full supply of thread, and its backward inclination taking place when the needle is rising, so as to take up the slack thread. The thread is wound about the rod back of its eye in its forward end to produce tension on the thread. The revolving pivots *c c′*, through which the rod is passed, permit the easy vibration of the rod, which slides through the head of the hinder pivot or pin, *c′*.

The described arrangement is such that the shuttle is in a better position to take the loop of the needle-thread than if it moved in a horizontal plane, because the nose of the shuttle will be directed upward when it reaches the place of the needle.

I claim as new in sewing-machines, and desire to secure by Letters Patent—

1. The combination of the elbow feeding-lever N, carrying an adjustable feed-propelling screw at its upper end, and having curved branches O P on its lower end, between which the pin I vibrates, substantially as set forth.

2. The combination of the following elements: the shuttle-carrier having the cam-pin *e′*, the feeding-plate R, and the elbow-lever N, the whole operating together substantially as described.

3. The combination of the following elements: first, the plate V, constructed substantially as above described; second, the shuttle-carrier; and, third, the feed-plate R, the same being arranged substantially as described, and for moving the feed-plate backward when it is in its lowest position.

4. The combination, in a sewing-machine, of the following elements: first, a main driving-shaft; second, a shuttle-driving shaft oscillated from the main shaft by a rod and crank; third, an oscillating shuttle-carrier; fourth, a feed-plate; fifth, a cam-pin, *e′*, for lifting and holding up the feed during the forward movement of the shuttle-carrier, substantially as described.

5. The combination, in a sewing-machine, of the following elements: first, a main driving-shaft; second, a shuttle-driving shaft oscillated from the main shaft; third, an oscillating shuttle-carrier; fourth, a feed-plate; fifth, a lever pivoted to a fixed fulcrum, one end of which is rocked by connections from the main shaft, and the other end of which operates to advance the feed; sixth, a cam-pin, *e′*, which lifts and holds up the feed during the forward movement of the shuttle-carrier, substantially as described.

6. In combination with an oscillating shuttle-carrier, a rotary driving-shaft, an intermediate rock-shaft, a crank-arm on the driving-shaft, an arm on the rock-shaft connected by a rod with the said crank, and an arm on the rock-shaft connected directly with said pivoted shuttle-carrier, all arranged in the described relation, to operate substantially as specified.

7. The combination of the driving-shaft B, the oscillating pivoted shuttle-carrier, the crank-arms H and F on the rock-shaft G, the rod E, and crank on the shaft B, substantially as set forth.

8. The combination of the driving-shaft B, feed-plate R, elbow-lever N, screw Q, crank-arms H F on the shaft G, rod E, and crank D, for the uses and purposes substantially as described.

MATHIAS SCHWALBACH.

Witnesses:
C. H. SCHMIDT,
IGNATZ FRIEDREICH.